United States Patent [19]

Goddard

[11] Patent Number: 5,034,039

[45] Date of Patent: Jul. 23, 1991

[54] FILTER DEHYDRATOR DEVICE

[76] Inventor: L. A. Goddard, P.O. Box 697, Hazelhurst, Ga. 31539

[21] Appl. No.: 580,487

[22] Filed: Sep. 11, 1990

[51] Int. Cl.⁵ .............................................. B01D 19/00
[52] U.S. Cl. ........................................ 55/275; 55/387
[58] Field of Search .......................... 55/275, 387, 389

[56] References Cited

U.S. PATENT DOCUMENTS

| | | |
|---|---|---|
| 2,225,990 | 12/1940 | Henry ................................... 55/387 |
| 4,278,453 | 7/1981 | Klein ..................................... 55/275 |
| 4,908,132 | 3/1990 | Koval et al. .......................... 55/387 |

Primary Examiner—Bernard Nozick
Attorney, Agent, or Firm—Thomas C. Saitta

[57] ABSTRACT

A filter and dehydrator device comprising a substantially cylindrical housing having an open end, a removable end cap attached to the open end and forming a gas-tight seal, the end cap having a sight glass, and gas conduits connected to said housing, one on the closed end and one on the side wall. A cylindrical filter core composed of a dehydrator material fits within the housing and has a saturation indicator material impregnated or attached to one end. The opposite end of the filter core has an internal cylindrical chamber extending at least two-thirds of the length of the filter core. A gasket is mounted on the circumference of the filter core such that gas must pass by the indicator material in order to flow from one gas conduit to the other.

9 Claims, 1 Drawing Sheet

FILTER DEHYDRATOR DEVICE

BACKGROUND OF THE INVENTION

This invention relates generally to the field of combination filter/dehydrators used in the refrigerant industry for purification of refrigerant gases such as Freon. In particular the invention relates to such devices having an end mounted sight glass for detection of color change in a saturation indicator and specific structural configurations for the filtering/dehydrating material.

In a refrigerant containing system, such as an air conditioner for example, moisture will develop and collect within the system. This moisture is harmful to the system and will cause the system to operate ineffectively. To prevent this, it is well known to include a dehydration device as a component of the system. The dehydrator contains a drying agent which absorbs any moisture present in the system. For example, silica gel is a common drying agent used in dehydrators. However, a problem with the use of drying agents is that they become saturated over time and it is necessary then to replace the saturated material with fresh material.

In some systems, this replacement of the drying agent is performed at intervals determined by time or quantity of gas flow. This is an inexact system, as it may well result in the material being changed either prematurely or belatedly. To improve on this, it is known to incorporate an indicator in the drying agent which will provide a signal when the drying agent is saturated. For example, it is known to incorporate cobalt chloride in the drying material. The cobalt chloride turns from blue to pink as the silica gel becomes saturated and the operator can judge the material replacement need by monitoring this color change. Schulstadt in U.S. Pat. No. 2,579,053 teaches such a dehydrator device. This device, similar in construction to other standard devices, comprises a cylindrical, transparent tube for housing the drying agent. As the color change progresses from one end to the other of the drying agent, the user knows when the time for changing the silica gel is approaching. A major drawback in this construction is that the cobalt blue is incorporated throughout the silica gel and a large transparent cylinder is required.

It is an object of this invention to provide a particular structure for a filter dehydrator housing incorporating a saturation indicator, where only a small amount of indicator is required and only a small sight glass at one end of the housing is needed to monitor the saturation level.

It is a further object of the invention to provide such a housing where the replacement of the filter/dehydrator material is achieved by removable of the end cap containing the sight glass.

It is a further object of this invention to provide such a device where the drying agent is in a compressed and fixed body, such that the body can be given a particular structural shape to improve performance and indicator ability by directing the gas flow over specific pathways.

It is a further object of the invention to provide such structural shapes whereby the gas flow pattern relative to the drying agent and the indicator material is improved.

BRIEF SUMMARY OF THE INVENTION

The invention comprises a relatively cylindrical housing having one open end and one substantially closed end, the housing having one gas conduit connected to the substantially closed end and another gas conduit connected to the side wall of the cylindrical housing in the vicinity of the open end. A flange extends outward from the side wall of the cylindrical housing adjacent the open end and this flange is adapted to receive fastening members to attach an end cap containing a sight glass to the open end of the housing. A gasket seals the connection between the end cap and the cylindrical housing.

A filter core comprised of compressed or sintered drying agent material, shaped substantially cylindrically, is contained within the interior of the housing. The filter core has an amount of saturation indicator material attached or impregnated into one end, in a position corresponding to the position of the sight glass. The opposite end of the filter core is hollowed to provide an axial cylindrical chamber, this chamber extending at least two thirds of the length of the filter core. An O-ring gasket is seated in a channel surrounding the filter core approximately one quarter of the length of the filter core from the end containing the indicator material. A wire rack for centering the filter core within the housing is attached to a filter end cap having a central screened aperture corresponding in size to the internal opening in the filter core. A gasket surrounds the filter end cap and is sized to match the interior of the housing, such that gas must flow through the filter core to pass from one gas conduit to the other. In an alternative embodiment, a slanted channel is positioned on the exterior of the filter core such that gas flowing into the wall mounted gas conduit is directed to the indicator material prior to passing through the main filter body.

In use, the operator observes the color change of the indicator material through the sight glass. When it is necessary to change the filter core due to saturation, the end cap is removed from the cylindrical housing, the wire basket and filter core is taken out, the filter core is removed and a new core placed in the wire rack. The wire rack and new filter core are then replaced in the housing and the end cap is resealed.

DETAILED DESCRIPTION OF THE INVENTION

Figure 1:
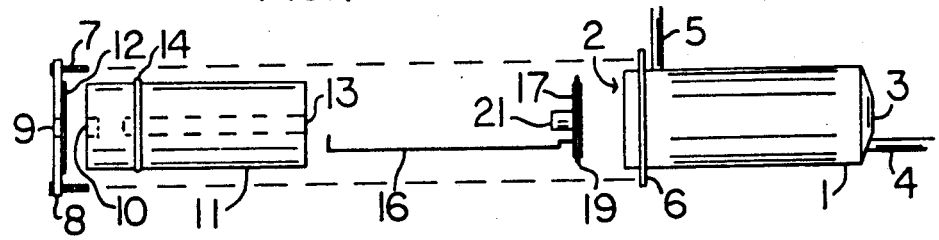
FIG. 1 is an expanded view of the invention showing the individual components of the invention.
Figure 2:
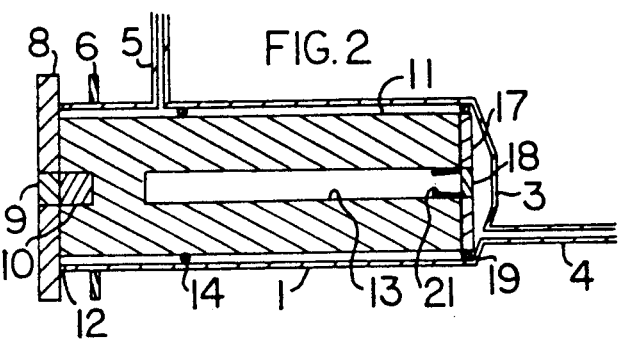
FIG. 2 is a cross-sectional view of one embodiment of the invention.
Figure 4:
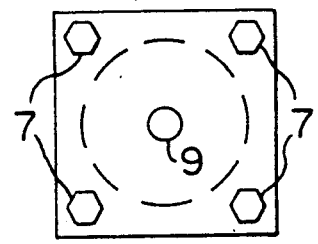
FIG. 4 is an end view showing the end cap and sight glass.

With reference to FIGS. 1 and 2, the invention is illustrated in greater detail. The invention comprises a generally cylindrical housing 1 having an open end 2 and an opposite closed end 3. An end gas conduit 4 extends from the closed end 3 of housing 1. A radial gas conduit 5 extends from the side wall of housing 1 at a position closer to open end 2 than to closed end 4. Radial gas conduit 5 is preferably positioned from the open end 2 approximately one fourth of the total length of housing 1. Except for gas conduits 4 and 5, and open end 2, housing 1 forms a closed internal cavity. Housing 1 can be made of metal, plastic or any other suitable material. Flange 6 extends from housing 1 adjacent the open end 2, and is apertured to receive fastening members 7 for attachment of the end cap 8 to housing 1.

End cap 8 is apertured to receive fastening members 7 in positions corresponding to the positions of the apertures in flange 6. A sight glass 9, comprising a transparent glass or plastic window, is preferably centered in end cap 8, allowing visual inspection of the indicator material 10 positioned on the end of filter core 11. A gasket 12 is mounted on the interior side of end cap 9 and corresponds in size and shape to the walls of the open end 2 of housing 1, such that a gas-tight seal is created when the end cap 9 is mounted onto housing 1. Saturation indicator material 10 is centered on one end of filter core 11. A cylindrical internal chamber 13, centered along the axis of filter core 11, extends within the filter core 11 at least two thirds of the total length. An O-ring gasket 14 surrounds the circumference of filter core 11 and is seated in an annular channel 15. The position of the O-ring gasket 14 must be such that the opening for radial gas conduit 5 is between the indicator material 10 and O-ring gasket 14. 0 ring gasket 5 thus prevents the gas from flowing away from the indicator material 10 and requires the gas to pass through the main body of filter core 11 to reach the other gas conduit 4.

A wire rack or other positioning means 16 maintains the filter core 11 centered within the internal cavity of housing 11. Wire rack 16 is attached to filter end cap 17. Filter end cap 17 has a centrally mounted screen 18 and a peripherally mounted gasket 19. Gasket 19 forms a seal between the filter end cap 17 and the internal walls of housing 1, such that the only flow path for gas relative to gas conduit 4 is through the screen 18 and internal chamber 13. Thus gasket 19, gasket 14 and gasket 12 create only one possible pathway for gas flow through housing 1, this flow being from radial gas conduit 5 past the indicator material 10, through the main body of filter core 11 and into the hollow chamber 13, then through screen 18 and out gas conduit 4. Of course, the gas flow can be in the opposite direction and the sequence described above is simply reversed.

Figure 3:
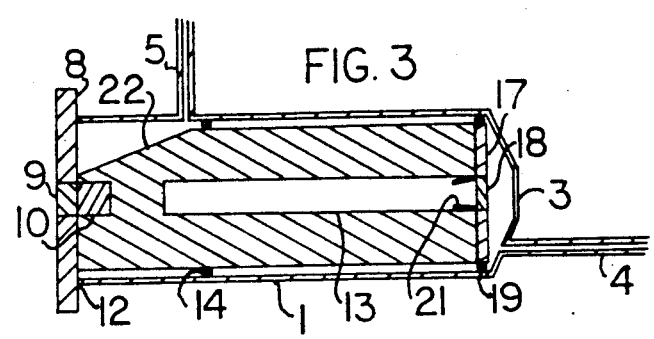
FIG. 3 is a cross-sectional view of another embodiment of the invention, showing the slanted channel on the filter core.

The operator observes the indicator material 10 by looking through sight glass 9, as shown in FIG. 3. When the indicator material signals that the drying material of filter core 11 is saturated, the operator removes the end cap 8 from housing 1 by loosening fastening members 7. The filter core 11, wire rack 16 and filter end cap are pulled from housing 1. The saturated filter core 11 is removed from wire rack 16 and a new filter core 11 inserted in its place. This assembly is then replaced in housing 1 and end cap 8 is reattached to flange 6. As an alternative, the end cap 8 can be attached to housing 1 by any equivalent means, such as for example threading the end of housing 1 and providing a corresponding threading on end cap 8, as long as a gas-tight seal is maintained.

Any suitable drying material may be used to construct filter core 11. A preferable and well known material is silica gel, which can be sintered or compressed into a stable cylindrical shape. Any suitable saturation indicator may be utilized, the well known indicator cobalt chloride being well suited to this application. The indicator material 10 may be impregnated into filter core 11 at the proper position, or a plug of the material may be attached to the end of filter core 11.

Figure 5:
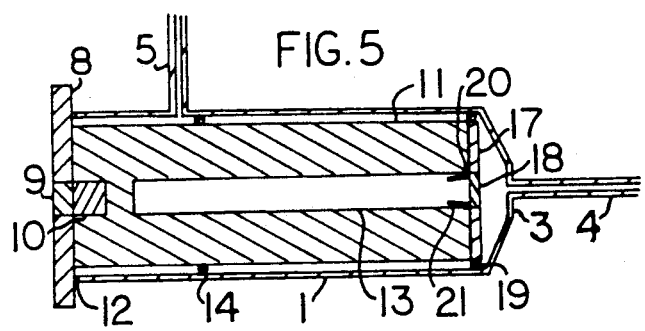
FIG. 5 is a cross-sectional view showing another embodiment of the invention where the flow of gas is reversed.

In the configuration illustrated, it is contemplated that the flow of refrigerant gas is from the radial gas conduit 5 through the unit and out the end gas conduit 4. In an alternative embodiment illustrated in FIG. 5, the flow is from end gas conduit 4 through the unit and out radial gas conduit 5. In this adaption, end gas conduit 4 is preferably centered along the main central axis of the housing 1. An additional 0 ring gasket means 20 is placed on nipple 21 of filter end cap 17. This nipple O-ring 20 seals the hollow chamber 13 such that gas flowing through screen 18 and into hollow chamber 13 can only exit by passing through the main body portion of filter core 11. In this embodiment it is preferable to fully extend the hollow chamber 13 as far as possible to the indicator material 10.

Figure 6:
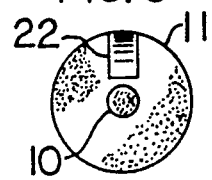
FIG. 6 is an end view of the filter core showing the slanted channel.

In still another embodiment, as shown in FIG. 3 and 6, the filter core 11 is provided with a channel 22. This channel 22 extends from a point on the circumference of filter core 11 corresponding to the opening of radial gas conduit 5 downward and towards the indicator material 10. This channel 22 therefore directs the gas flowing from radial gas conduit 5 directly to the indicator material 10.

Given the particular structure described above for the invention, it is seen that the goal of indicating when the drying agent is saturated is accomplished with only a small amount of indicator material and the structure of the housing is simplified so that only a small sight window on the end of the structure is necessary for visual checking. The unique structure of the filter core directs all of the gas flow across, through or in the vicinity of the indicator material, so that the entire core need not be impregnated with the indicator material. The above examples are by way of illustration only, and obvious substitutions and equivalents may be known to those skilled in the art. The full scope and definition of the invention therefore is to be as set forth in the following claims.

I claim:

1. A device for filtering and dehydrating a gas, comprising:
   (A) a cylindrical closed end and one open end;
   (B) a removable end cap attached to said housing on said open end, said end cap forming a gas-tight seal with said housing, and said end cap having a transparent portion;
   (C) an end gas conduit connected to said closed end of said housing;
   (D) a radial gas conduit connected to said side wall of said housing;
   (E) a substantially cylindrical filter core composed of a dehydrating material, adapted to fit within said housing, said filter core having an internal cylindrical chamber centered about the central axis of said filter core and extending from one end of said filter core at least two thirds the length of said filter core;
   (F) saturation indicator material positioned on said filter core on the opposite end from said internal chamber and adjacent said transparent portion;
   (G) gasket means mounted circumferentially on said filter core, whereby said gasket means forms a gas-tight seal with said annular side wall of said housing, and where said gasket means is positioned between said radial gas conduit and said end wall.

2. The device of claim 1, where said filter core further comprises channel means extending from said saturation indicator means to said radial gas conduit.

3. The device of claim 1, where said filter core further comprises channel means extending from said saturation indicator means to said radial gas conduit.

4. The device of claim 1, where said filter core is composed of silica gel.

5. The device of claim 1, where said saturation indicator material is cobalt chloride.

6. The device of claim 1, where the saturation indicator material is impregnated in the filter core.

7. The device of claim 1, further comprising positioning means to center said filter core within said housing.

8. The device of claim 7, further comprising a filter end cap attached to said positioning means, said filter end cap comprising a screen and peripheral gasket means forming a gas-tight seal with said annular side wall of said housing.

9. The device of claim 8, further comprising gasket means forming a gas-tight seal between said filter end cap and said filter core.

* * * * *